(12) United States Patent
Cheng

(10) Patent No.: US 8,243,077 B2
(45) Date of Patent: Aug. 14, 2012

(54) METHOD FOR GENERATING STROKE-BASED FONT CHARACTERS FOR A LOW-RESOLUTION DISPLAY

(75) Inventor: Kuo-Young Cheng, Taichung Hsien (TW)

(73) Assignee: DynaComware Taiwan Inc., Taipei (TW)

(*) Notice: Subject to any disclaimer, the term of this patent is extended or adjusted under 35 U.S.C. 154(b) by 764 days.

(21) Appl. No.: 12/202,158

(22) Filed: Aug. 29, 2008

(65) Prior Publication Data

US 2010/0053171 A1    Mar. 4, 2010

(51) Int. Cl.
*G06F 15/00* (2006.01)

(52) U.S. Cl. ........ 345/469; 345/468; 345/470; 345/471; 345/472

(58) Field of Classification Search ........... 345/467–471
See application file for complete search history.

(56) References Cited

U.S. PATENT DOCUMENTS

| | | | | |
|---|---|---|---|---|
| 5,050,229 A | * | 9/1991 | Barski et al. | 382/259 |
| 5,319,358 A | * | 6/1994 | Martinez et al. | 345/469 |
| 5,802,532 A | * | 9/1998 | Nakayama et al. | 715/203 |
| 5,852,448 A | | 12/1998 | Cheng | |
| 6,151,032 A | | 11/2000 | Cheng | |
| 6,157,390 A | | 12/2000 | Cheng | |
| 6,501,475 B1 | | 12/2002 | Cheng | |
| 6,661,417 B1 | | 12/2003 | Cheng | |
| 7,199,797 B2 | * | 4/2007 | Cheng | 345/470 |
| 7,710,422 B2 | * | 5/2010 | Matskewich et al. | 345/467 |
| 2007/0216689 A1 | * | 9/2007 | Stamm et al. | 345/469 |

OTHER PUBLICATIONS

Beat Stamm, Microsoft Typography—The raster tragedy at low resolution, www.microsoft.com/typography/tools/trtalr.htm, Excerpts from an Oct. 1997 training presentation Updated Mar. 1998.*

* cited by examiner

*Primary Examiner* — Ulka Chauhan
*Assistant Examiner* — Sultana M Zalalee
(74) *Attorney, Agent, or Firm* — Seep IP Law Group PLLC

(57) ABSTRACT

A method and computer graphical user interface tool for generating and/or modifying character font data to be suitable for low-resolution display are provided. The method generally includes four steps. First, a set of characters to be displayed on a low-resolution display is received. Each character is formed with one or more strokes/glyphs, and all of the strokes/glyphs are represented by a set of basic strokes/glyphs, wherein each basic stroke/glyph is defined by key points and width values. Second, the received set of characters is projected on a low-resolution pixel matrix screen having two-dimensional coordinates and corresponding to the low-resolution display. Third, each stroke/glyph forming the set of characters is redefined, with key points and/or width values of the stroke/glyph are adjusted according to predefined rules, to thereby form a redefined set of characters. Fourth, the redefined set of characters are rendered according to predefined rendering criteria.

16 Claims, 20 Drawing Sheets

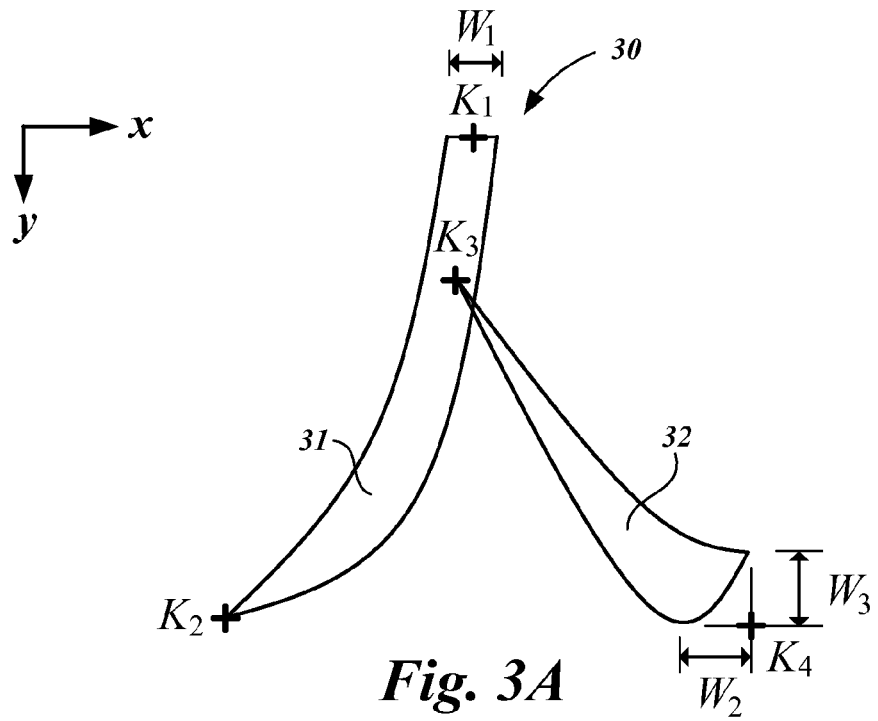
*Fig. 3A*
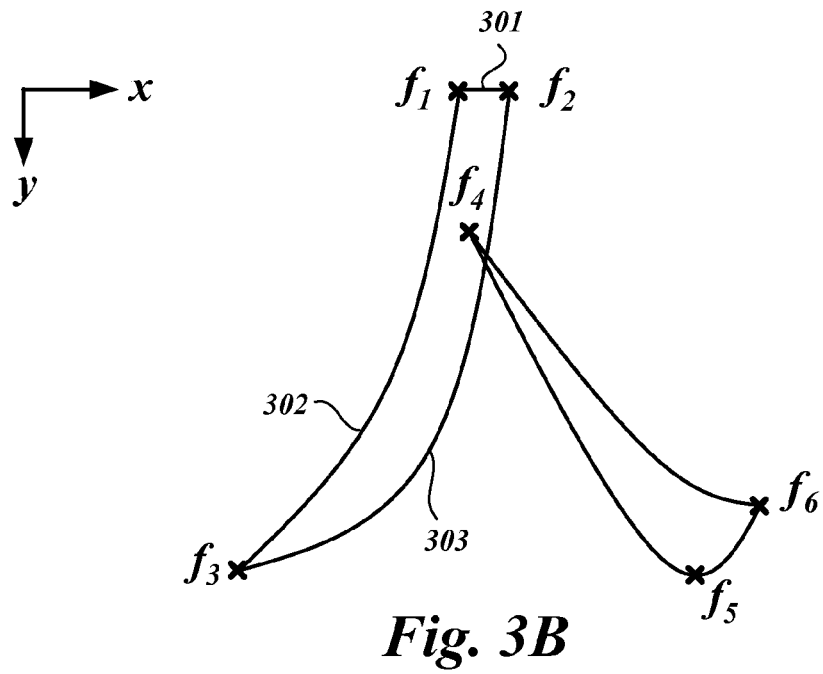
*Fig. 3B*
| basic stroke ID | key points($k_i$) | | widths($w_i$) | |
|---|---|---|---|---|
| 511 | $(x_1,y_1)$ | $(x_2,y_2)$ | $w_1$ | |
| 623 | $(x_3,y_3)$ | $(x_4,y_4)$ | $w_2$ | $w_3$ |
*Fig. 3C*

METHOD FOR GENERATING STROKE-BASED FONT CHARACTERS FOR A LOW-RESOLUTION DISPLAY

FIELD OF THE INVENTION

The present invention relates to digital representations of typographic characters or other symbols, and more particularly, to a system, method, and computer-readable medium including instructions for generating/modifying font data suitable for display on a relatively low-resolution screen.

BACKGROUND OF THE INVENTION

Many font generating systems exist for generating Asian character fonts ("Asian fonts"). An Asian font is composed of a large number of ideographs that represent the characters in the Asian language. Asian languages may include thousands of characters. For example, the Chinese language includes over twenty-thousand distinct characters.

One conventional computer technique for generating character patterns in an Asian font uses font outlines. This system is described in "PostScript Language Tutorial and Cookbook" by Adobe Systems, Inc. (Addison-Wesley Publishing, 1985). In this method, the outline of a character pattern is stored as a collection of straight lines and curves. There are some disadvantages associated with this technique. First, because individual font outlines must be defined and stored for tens of thousands of different characters, the memory requirement is relatively high. Second, the font outlines that are stored in high resolution are suited for display only in high resolution; they are not suited for high-quality display in relatively low-resolution.

Another method of generating an Asian font uses stroke-based character pattern data, wherein each stroke within a character is separately defined. A character typically consists of multiple strokes that overlap or intersect with each other. The stroke-based character data consist of key points, width values, feature points, and curve ratios, which together define the outline of each stroke. The construction and rendering of such stroke-based character data are described in detail in U.S. Pat. Nos. 5,852,448, 6,151,032, and 6,157,390, which are explicitly incorporated by reference herein. The stroke-based technique is suited for reducing the memory requirements for fonts.

Yet another method of generating an Asian font uses glyph-based character pattern data, wherein each glyph within a character is separately defined. An Asian character typically consists of one or more glyphs, each of which in turn consists of one or more strokes. For example, several strokes in a character that intersect or overlap with each other often create a complicated overall geometric shape, which is a glyph. In the glyph-based technique, each glyph is defined in terms of key points, width values, feature points, and curve ratios, as in the stroke-based technique described above. The construction and rendering of the glyph-based character pattern data are described in detail in U.S. Pat. Nos. 6,501,475 and 6,661,417, which are explicitly incorporated by reference herein.

Still another method of generating a set of Asian fonts for display in gray scale is known, wherein each character comprises one or more strokes/glyphs, and each stroke/glyph is defined in silhouette-oriented representation. The construction and rendering of the silhouette-oriented representation for a display in gray scale is described in detail in U.S. Pat. No. 7,199,797, incorporated by reference herein.

With the advent of portable electronic device technology such as cellular phones, PDAs, and portable digital audio devices, relatively long binary text images are displayed, in smaller size, on the screen of such portable electronic devices. As these characters are typically defined to be displayed on a higher resolution screen, rendering these characters on a lower resolution screen causes severe degradation of the resulting text images. This is particularly true with Asian characters, which tend to have relatively more complicated overall geometric shapes. For example, FIG. 1A illustrates a character 10 superimposed on a low-resolution pixel matrix screen 11, and FIG. 1B illustrates an image of the character 10 as rendered on a low-resolution screen according to a conventional method (e.g., any pixel in which more than 50% of the pixel area is occupied by a character is activated/filled). As shown in FIG. 1B, the character 10, as rendered, is degraded to be almost unrecognizable. For example, strokes 12, 13, 14, and 15 of the character 10 of FIG. 1A have merged together to form a generally rectangular blob 16 in FIG. 1B. As another example, two similarly shaped components, B and B', located on each side of a vertical stroke 17 of the character 10, are shown quite dissimilarly from each other, as C and C' in FIG. 1B, when rendered on a low-resolution screen. FIG. 1C shows five Chinese characters, including the character 10 at the bottom, rendered on a relatively low-resolution display in degraded quality.

A need exists for a system, method, and computer-readable medium including instructions for generating or modifying fonts, which may have been originally designed for a high-resolution display, for high-quality rendering on a relatively low-resolution display.

SUMMARY OF THE INVENTION

The present invention provides a system, method, and computer-readable medium including instructions for generating and/or modifying a set of stroke-based characters to be displayed on a low-resolution screen.

In accordance with one embodiment of the present invention, a method is provided for generating characters for a low-resolution screen. The method initially receives a set of characters, each consisting of one or more strokes. Some of these strokes are similarly shaped to form a set. For each set of similarly-shaped strokes, one "basic" stroke is predefined which best represents the similarly-shaped strokes topographically, according to the method described in the patents incorporated by reference above. Each basic stroke, and hence each of the strokes topographically represented by that basic stroke, are defined in terms of key points, width values, feature points, and curve ratios.

Next, the received set of characters, or more specifically the strokes forming each of the received characters, are rendered on a relatively low-resolution screen consisting of an array of pixels, using any suitable pixel-coverage technique. For example, any pixel in which more than 50% of its area is covered or occupied by stroke(s) is activated and filled. Then, according to a predefined set of rules, key points of the strokes may be moved to a centerline of a pixel, and width values of the strokes may be reduced to fit within a single pixel, to thereby form modified font data with redefined key points and width values. Thereafter, the modified font data, with newly defined key points and width values, are rendered, again using any suitable pixel-coverage technique together with certain predefined rendering criteria.

In accordance with one aspect of the invention, the application of a predefined set of rules to modify font data for a low-resolution screen may be performed manually using a computer graphical user interface tool, or automatically or semi-automatically using suitable image analysis techniques.

In this regard, the invention also provides a computer graphical user interface tool including instructions for allowing a font designer to perform various embodiments of the method.

In accordance with another aspect of the invention, a further method is proposed for providing space between two strokes that may otherwise merge together when rendered on a low-resolution screen. This further method may be used independently of or jointly with the method of modifying font data, as discussed above. According to the further method, when merged strokes are identified, the key point(s) of one of the strokes may be moved, to thereby provide space between the merged strokes.

The present invention also provides a computer-readable medium including computer-executable instructions for practicing various embodiments of the method.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 3A and 3B illustrate a sample character composed of strokes defined by key points, width values, feature points, and curve ratios;

FIG. 3C shows the stroke-based font data defining the character of FIGS. 3A and 3B;

FIG. 6 illustrates projecting a character on a pixel matrix screen, which has two-dimensional coordinates corresponding to a low-resolution screen the character is intended to be displayed on;

DETAILED DESCRIPTION OF THE PREFERRED EMBODIMENTS

Figure 2:
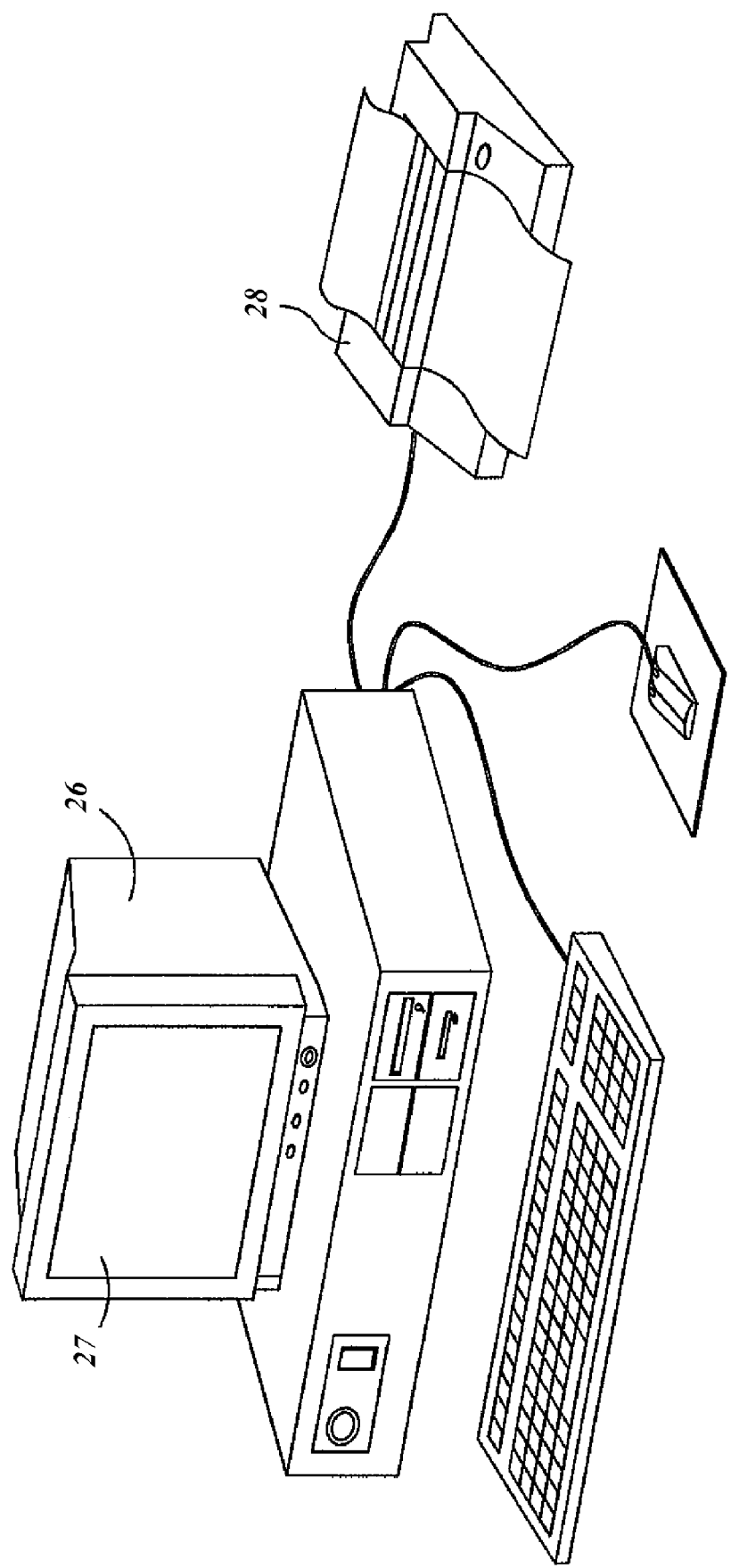
FIG. 2 depicts a system or graphical computer user interface tool suitable for practicing a method of the present invention.

FIG. 2 illustrates a typical computing environment, in which various methods of the present invention may be implemented. A general purpose digital computer 26, including a display 27 and attached to a printing device 28, is fully capable of carrying out various methods of the present invention. The display 27, the printing device 28, and any other output device (monitor, plotter, etc.) may display, print, and otherwise output the font generated and/or modified in accordance with the present invention. Other types of computing systems, such as networked or mainframe-based systems, may also be used to carry out methods of the present invention, as apparent to those skilled in the art.

While the following describes the present invention as applied to generating and modifying characters each consisting of one or more strokes, it should be understood that the present invention is equally applicable to generating and modifying characters each consisting of one or more glyphs. As discussed in the background section above, a glyph is a subunit of a character and consists of one or more strokes. Both strokes and glyphs are defined similarly in terms of key points, width values, features points, and curve ratios. Therefore, it should be appreciated by those skilled in the art that the following discussion of a method directed to generating and modifying characters according to basic strokes, is readily extendible to a method for generating and modifying characters according to basic glyphs. Thus, as used herein, and as long as the context permits, the term "stroke" encompasses both stroke and glyph.

FIG. 3A illustrates a character 30 formed by two strokes, 31 and 32. Stroke 31 is defined by key points ($K_1$ and $K_2$) and a width value ($W_1$), and stroke 32 is defined by key points ($K_3$ and $K_4$) and width values ($W_2$ and $W_3$). FIG. 3B illustrates feature points, ($f_1$, $f_2$, and $f_3$) for stroke 31 and features points ($f_4$, $f_5$, and $f_6$) for stroke 32, and curve ratios (not shown), all determined based on the key points and width values, as described in U.S. Pat. Nos. 5,852,448, 6,151,032, and 6,157,390, incorporated above. As described in detail in the incorporated patents, one of the characteristics of Asian languages is that many strokes are shared by many characters. Each set of similarly-shaped strokes can therefore be topographically represented by a "basic stroke." Each basic stroke is first defined by key points and width values. Key points are placed at edges or intersecting or bent portions of the basic stroke, so that moving the key points will change the outline shape of the basic stroke. Width values are also placed at locations within the basic stroke so that changing the width values will change the outline shape of the basic stroke. Each basic stroke is also associated with equations that obtain feature points based on the key points and the width values. For the illustrated example of FIGS. 3A and 3B, the equations for obtaining the feature points ($f_1$, $f_2$, $f_3$, $f_4$, $f_5$, and $f_6$) may be as follows:

$$f_1 = (X_1 - W_1/2, Y_1)$$

$$f_2 = (X_1 + W_1/2, Y_1)$$

$$f_3 = (X_2, Y_2)$$

$$f_4 = (X_3, Y_3)$$

$$f_5 = (X_4 - W_2, Y_4)$$

$$f_6 = (X_4, Y_4 - W_3) \quad \text{(Equations 1)}$$

where (Xi, Yi) are X-Y coordinates of key point $K_i$.

As illustrated, feature points have predefined spatial relationship to the key points and width values. As shown in FIG. 3B, feature points are generally placed on the basic stroke's outline at locations where the outline changes its direction or curvature. Further, each basic stroke is associated with curve ratios that are preferably defined according to various resolution levels, and designed to create curve segments between two consecutive feature points depending on the resolution level of a particular output device. The details concerning the use of curve ratios are also disclosed in the incorporated patents.

Each basic stroke is assigned a stroke identification value (basic stroke ID), as shown in FIG. 3C. In the illustrated example, stroke 31 is assigned stroke ID "511," and is defined in terms of its key points and width values. Similarly, stroke 32 is assigned stroke ID "623," and is defined in terms of its key points and width values. Each of the defined basic strokes can then be used to define other strokes with similar shapes by having their key points moved and/or the width values changed. When the key points and width values are changed to slightly modify the shape of a basic stroke to thereby define a new shape for a particular stroke, their associated feature points will be automatically recalculated based on the equations (unchanged) associated with the basic stroke (e.g., Equations 1 above). Further, new curve segments will be created between recalculated feature points according to the predefined curve ratios and depending on the resolution level of an output device. Also, any changes made to the key points and width values of a basic stroke may automatically be reflected in the set of strokes topographically represented by that basic stroke. The details concerning defining similarly-shaped strokes based on a basic stroke are also disclosed in the incorporated patents.

Figure 4A:
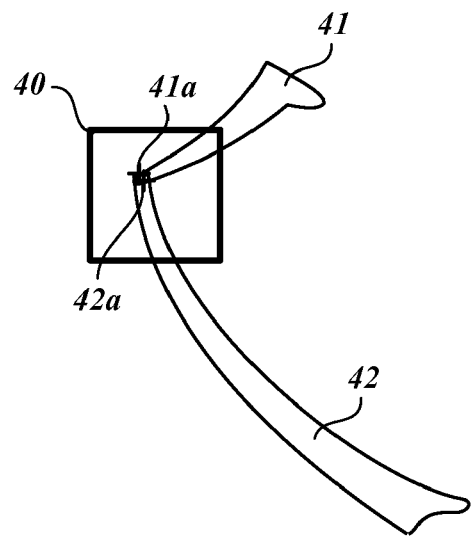
FIGS. 4A and 4B illustrate joint-type strokes whose respective key points occupy a single pixel.
Figure 4B:
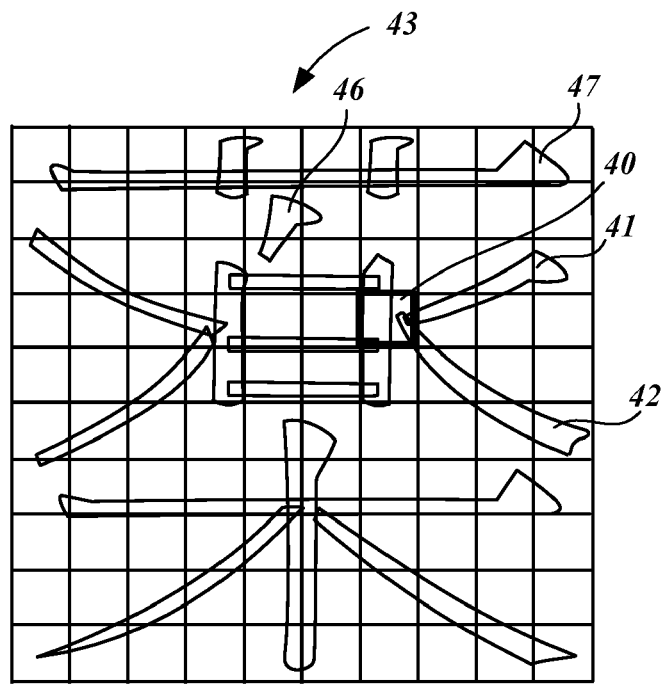

FIGS. 4A and 4B illustrate examples of joint-type strokes. As used herein, if a pixel contains two or more key points, each belonging to a different stroke, then the pixel is said to be occupied or covered by joint-type strokes. FIG. 4A illustrates a pixel 40, which includes a key point 41a of a stroke 41 and a key point 42a of a stroke 42. Thus, strokes 41 and 42 are said to be joint-type strokes with respect to the pixel 40 in a low-resolution matrix. FIG. 4B illustrates a character 43 having many joint-type strokes, such as the joint-type strokes 41 and 42 whose key points fall on the pixel 40. All strokes forming the character 43, which are not joint-type strokes, are classified as independent-type strokes. For example, strokes 46 and 47 are both independent-type strokes. The concept of joint-type strokes will be used in a method of providing space between merged/jammed strokes, to be described later in reference to FIG. 14. Although the process of identifying a stroke type (joint or independent) may be automatically implemented based on the criteria described above, it may also be manually implemented by a font designer on a pixel matrix screen.

Figure 5:
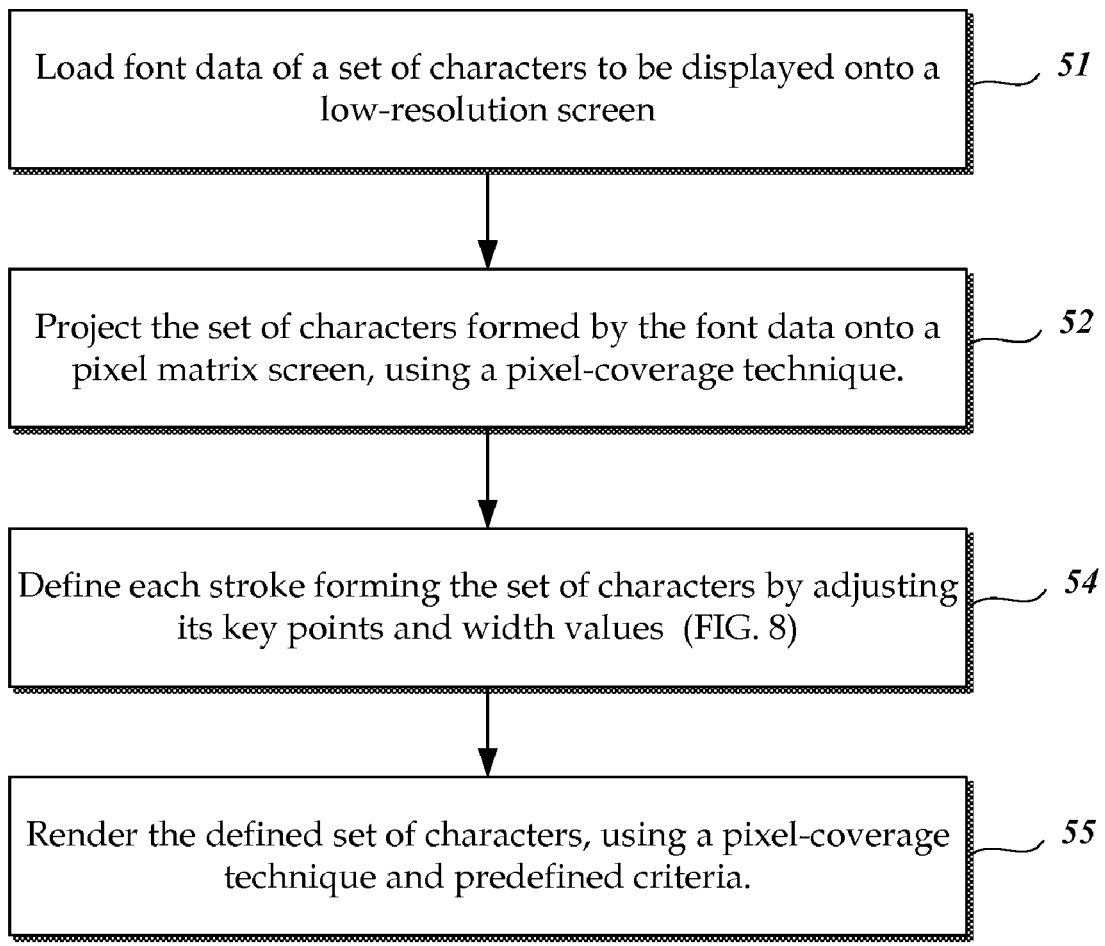
FIG. 5 is a flowchart depicting a method of generating or modifying a set of characters to be displayed on a low-resolution screen in accordance with one embodiment of the present invention.

FIG. 5 is a flowchart depicting a method of generating and/or modifying a set of characters to be displayed on a low-resolution screen. As used herein, "low-resolution" refers to a relatively lower level of resolution as compared to the level of resolution at which the set of characters were originally defined or designed. For example, a low-resolution screen may mean a pixel matrix screen for displaying each character with 16×16 pixels, 10×10 pixels, or 8×8 pixels.

At block 51, a font designer selects a set of characters to be defined for a low-resolution screen, and the set of characters is loaded to a computing system, such as a general-purpose computer shown in FIG. 2. A font designer is typically a graphic designer attempting to create a font database for commercial use. Each set of characters consists of one or more strokes, and all the strokes can be divided into sets of similarly-shaped strokes. For each set of similarly-shaped strokes, one basic stroke that best represents the similarly-shaped strokes topographically is predefined in terms of key points, width values, feature point, and curve ratios.

Figure 6:
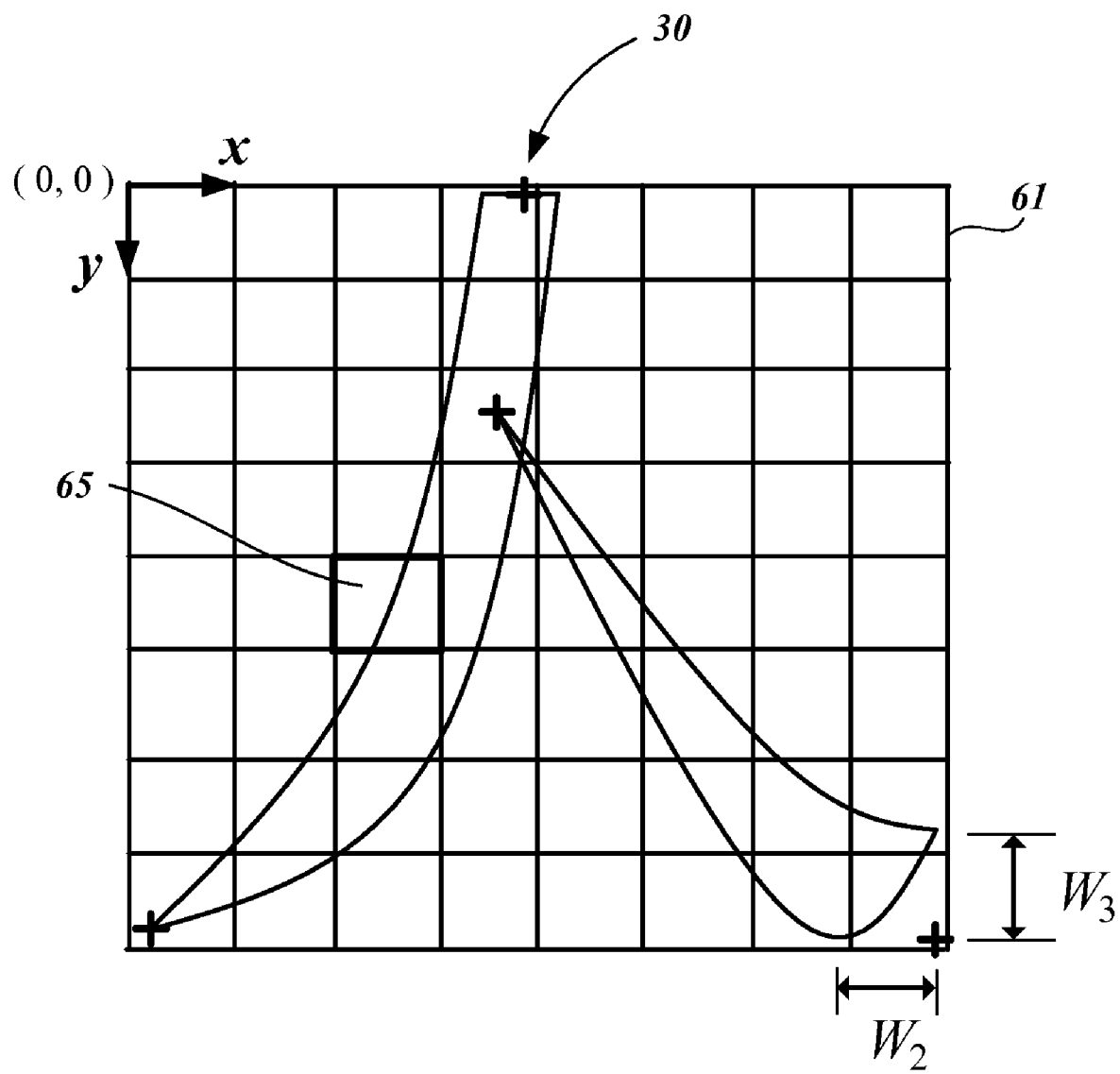

At block 52, the received (or loaded) set of characters, defined in terms of key points, width values, feature point, and curve ratios of strokes, as described above, is projected onto a low-resolution pixel matrix screen corresponding to a certain low level of resolution at which the set of characters is intended to be displayed. The position of each pixel is defined according to two dimensional coordinates (e.g., X-Y coordinates). The number of pixels on the pixel matrix screen may be set automatically based on a desired resolution level, or manually by the font designer. FIG. 6 illustrates a character 30 shown (superimposed) on a pixel matrix screen 61 corresponding to a low-resolution screen of the size 8×8 for displaying each character. Each pixel on the pixel matrix screen 61 can be defined based on its X-Y coordinates. Each character is rendered using a pixel-coverage technique. Specifically, a coverage value for each pixel is calculated, which may be defined in terms of a percentage of a pixel area covered/occupied by stroke(s). In other words, a coverage value is calculated based on a coverage area within the stroke outline (s).

Figure 7:
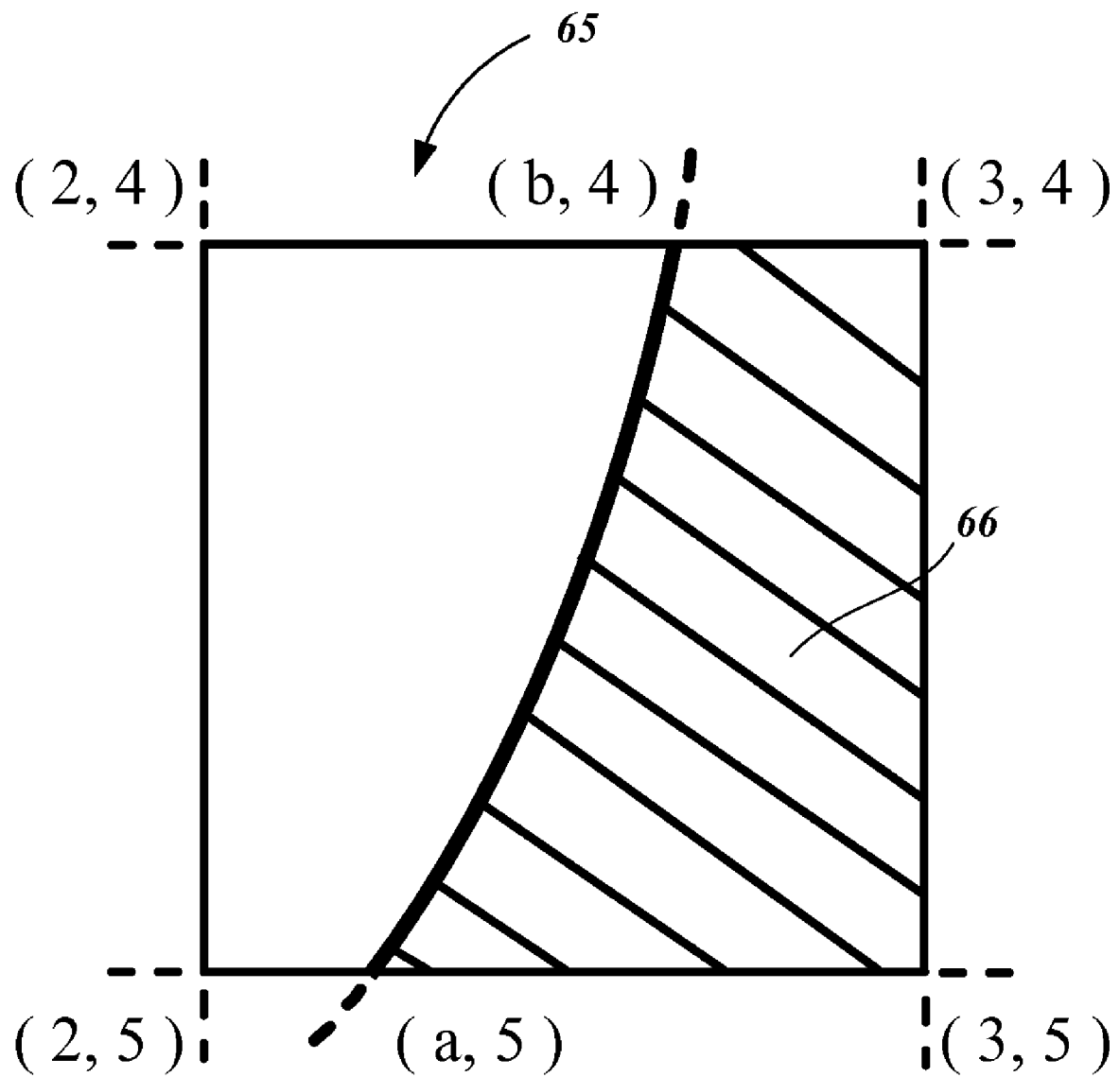
FIG. 7 is an enlarged view of one pixel within the pixel matrix screen of FIG. 6.

FIG. 7 is an enlarged view of pixel 65 in FIG. 6. In the illustrated example, pixel 65 can be defined by its four vertices (2, 4), (2,5), (3,5), and (3,4). The pixel 65 is covered by a portion 66 of the stoke (hatched portion), and the coverage value of the pixel 65 can be calculated as the ratio between the hatched portion area and the total pixel area, based on the coordinates of the pixel vertices and the intersecting points (a, 5) and (b, 4), at which the stroke outline(s) intersect the pixel outline. Any pixel with a coverage value above a threshold (e.g., 50%) may be activated (or filled).

A pixel may be covered by a portion of a stroke, while another pixel may be covered by two or more portions of two or more different strokes, respectively. In the latter case, the two or more different strokes may be independent-type strokes or joint-type strokes. In addition to a total coverage value, a coverage value of each of multiple strokes that occupy a pixel may be calculated and stored, together with each one's basic stroke ID value and stroke type (independent-type or joint-type).

Figure 8:
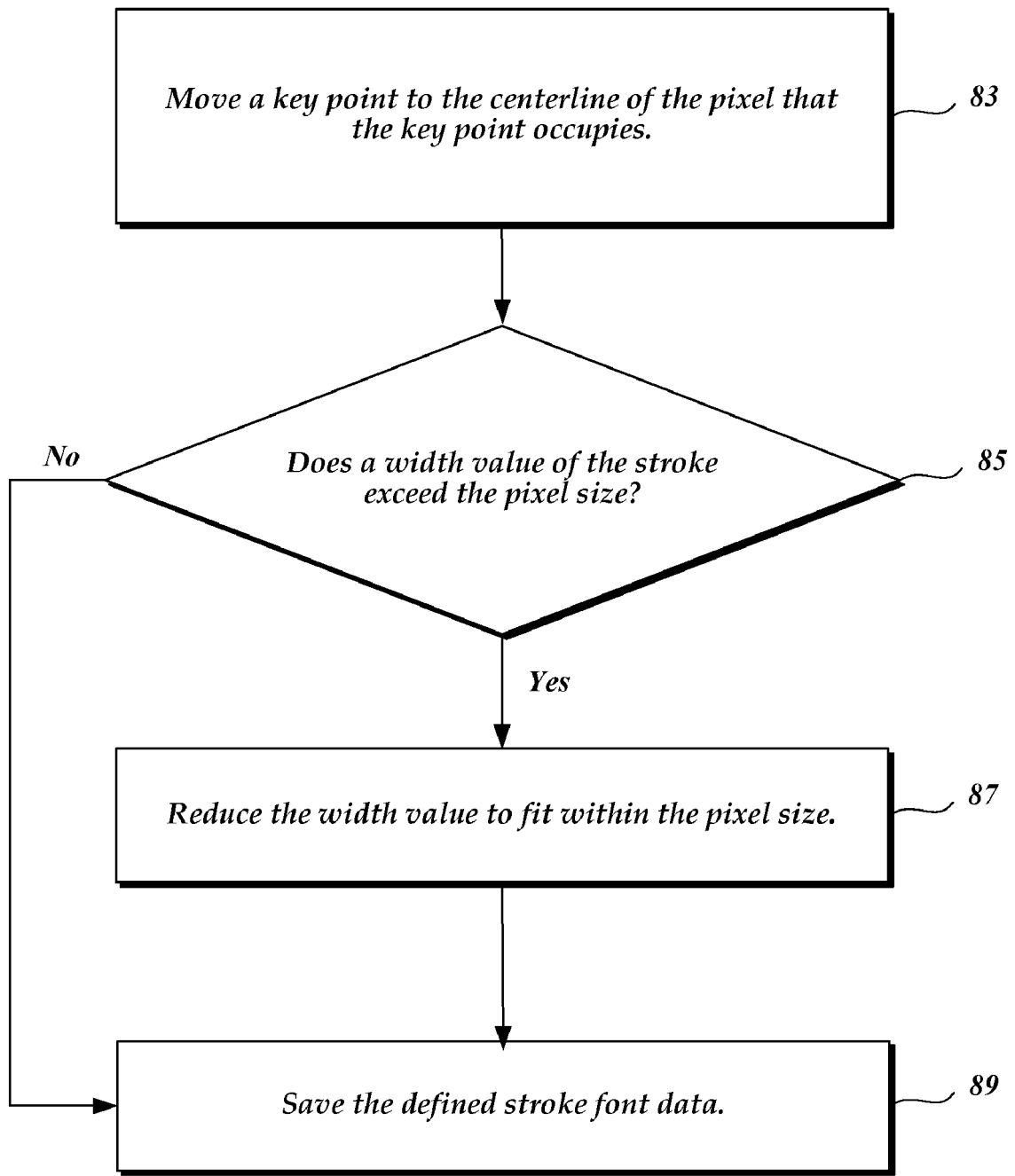
FIG. 8 is a flowchart depicting detailed steps of redefining key points and width values of strokes, to be used in the method of FIG. 5.
Figure 9A:
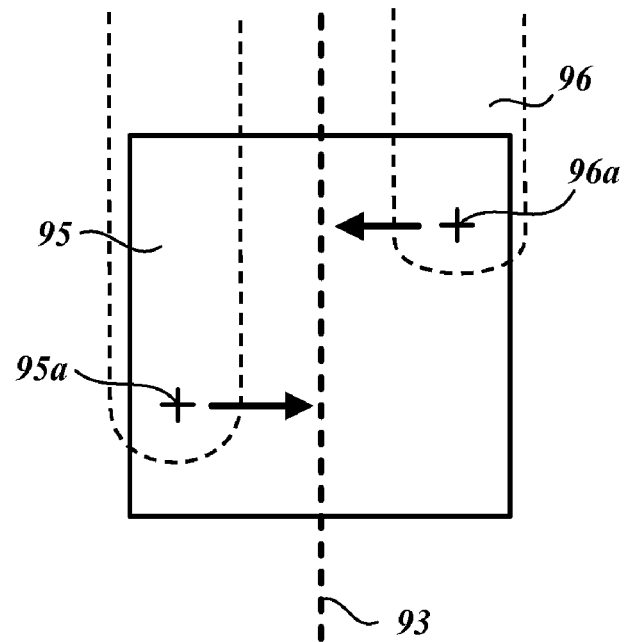
FIGS. 9A and 9B illustrate the movement of key points of a vertical stroke and a horizontal stroke, respectively.
Figure 9B:
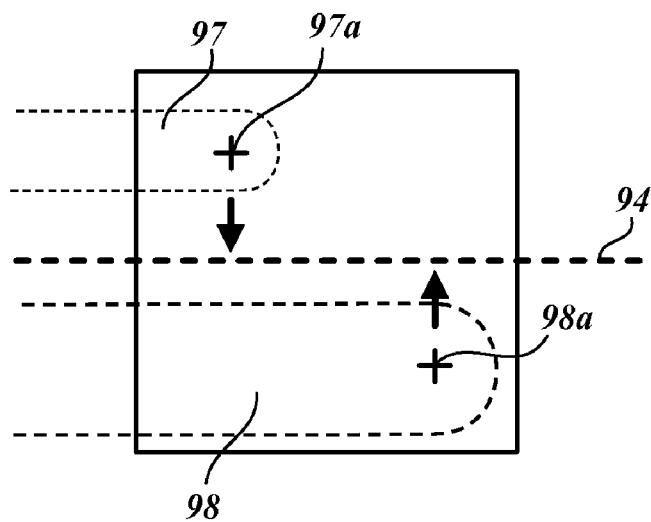

At block 54 of FIG. 5, each stroke forming a character to be displayed on a low-resolution screen is defined or redefined, with its key points and width values adjusted according to a predefined set of rules. FIG. 8 is a flowchart depicting in detail the steps of block 54. In block 83 of FIG. 8, a key point of each stroke is moved to a position on a centerline of the pixel that the key point occupies. A centerline may be a vertical centerline 93 as shown in FIG. 9A, or a horizontal centerline 94 as shown in FIG. 9B, and an appropriate centerline is chosen based on whether a stroke is generally vertical or horizontal. Specifically, strokes may be topographically analyzed and classified into vertical strokes (e.g., stroke 17 in FIG. 1A) or horizontal strokes (e.g., stroke 18 in FIG. 1A). Strokes that extend somewhat diagonally may be classified into one or the other category according to a predefined rule. (For example, both of the two strokes in FIG. 6 may be classified as vertical strokes though they are not perfectly vertical.) Referring back to FIG. 9A, for vertical strokes 95 and 96, their key points 95a and 96a, respectively, are moved horizontally to the vertical centerline 93 of the pixel each is included in. Referring to FIG. 9B, for horizontal strokes 97 and 98, their key points 97a and 98a, respectively, included in a pixel are moved vertically to the horizontal centerline 94 of that pixel.

Figure 10:
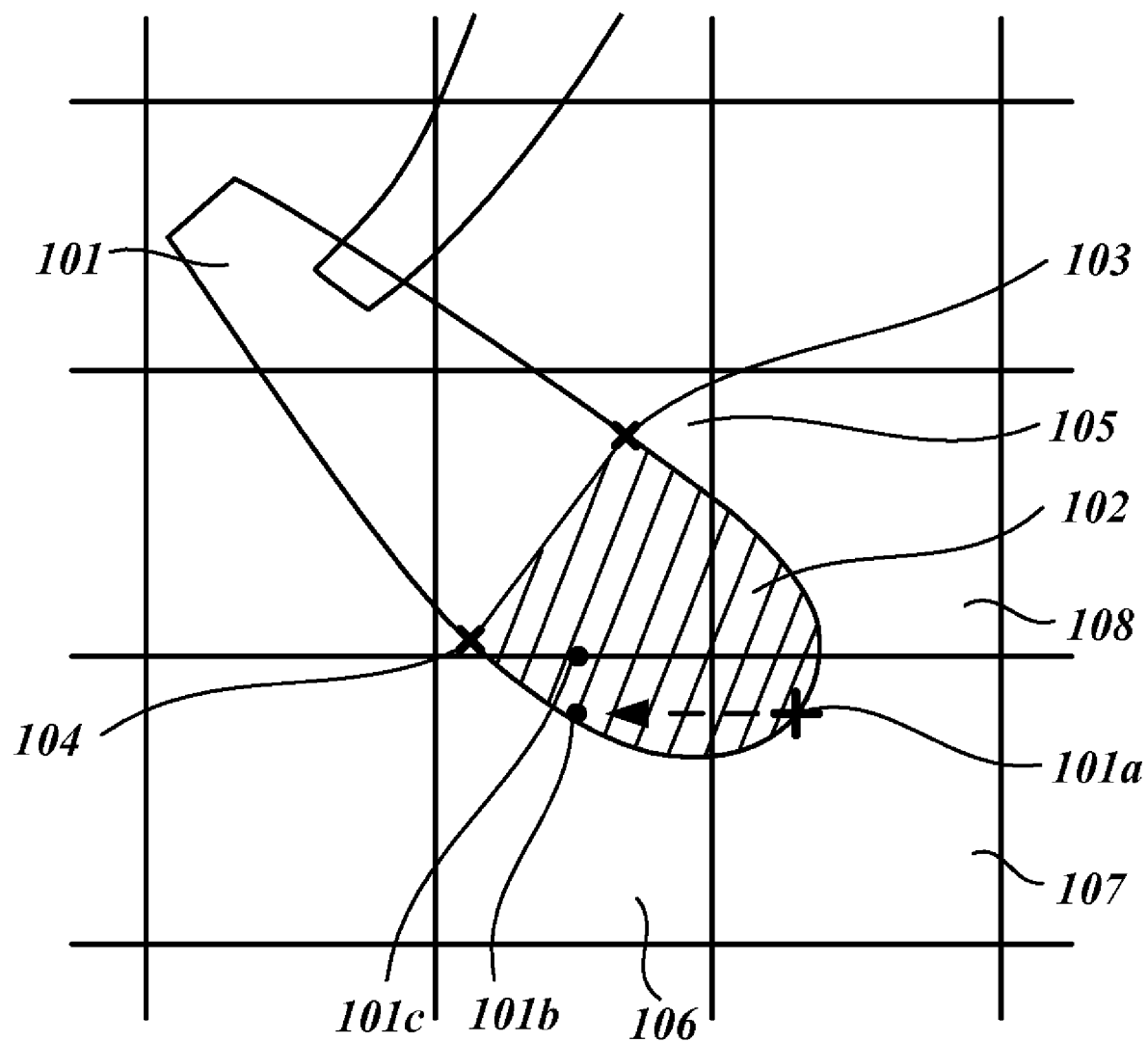
FIG. 10 illustrates the movement of a key point that controls a curved portion of a stroke occupying multiple pixels.

Referring to FIG. 10, in one embodiment, when a curved portion 102 (indicated as a hatched portion) of a stroke defined by curved outline(s) occupies more than one pixel, the key point that controls the curved portion 102 is moved to a position along the centerline of the pixel that has the largest coverage value for that stroke. In FIG. 10, a key point 101a of a stroke 101 controls the curved portion 102 of the stroke 101, which is defined by curved segments between feature point 103 and 104. The curved portion 102 covers four pixels 105, 106, 107, and 108 in the pixel matrix screen. Since the pixel 105 has the largest coverage value (i.e., the largest coverage percentage), the key point 101a is moved to a position along the centerline of the pixel 105. In one embodiment, the key point 101a is moved horizontally to a position 101b within the pixel 106 along the centerline of the pixel 105. In another embodiment, the key point 101a is moved to a position 101c within the pixel 105 along the centerline of the pixel 105.

Figure 11A:
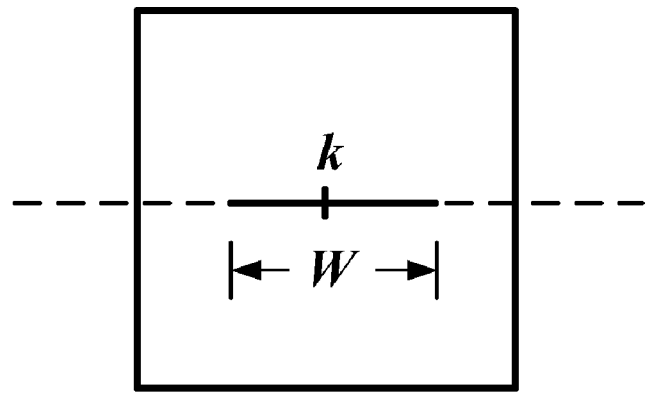
FIGS. 11A and 11B illustrate adjustment of width values to fit within a single pixel.
Figure 11B:
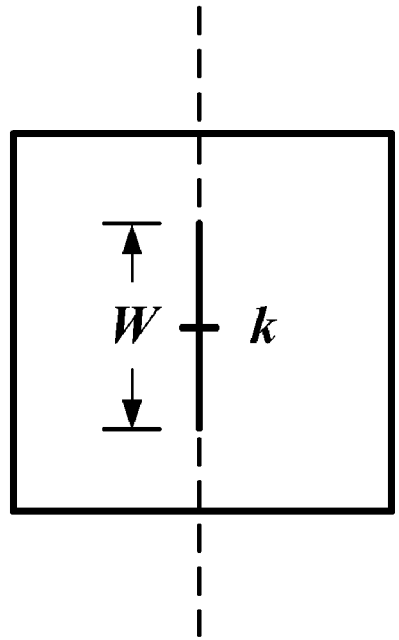

Next, in block 85 of FIG. 8, it is determined whether each width value of a stroke exceeds a pixel size (e.g., pixel width or pixel length). If the width value of a stroke exceeds the pixel size, then in block 87 the width value is reduced to fit within the pixel size. For example, in FIG. 6, both width values $W_2$ and $W_3$ of the stroke forming the character 30 exceed one pixel size. FIG. 11A shows the case in which a width value is defined horizontally, such as ($W_2$) in FIG. 3A. FIG. 11B shows the case in which a width value is defined vertically, such as ($W_3$) in FIG. 3A. In both cases, the width values are illustrated to be adjusted so as to fit within one pixel size, to thereby change the stroke shape. In block 89 of FIG. 8, the redefined font data, with readjusted key points and width values, are saved.

The order of the font data definition/modification process, in which key points and width values are adjusted, is changeable. In one embodiment, the position of any key point is adjusted, and then any width value is adjusted, while in another embodiment, a width value is adjusted, and then the position of a key point is adjusted. In any event, according to various exemplary embodiments of the present invention, each character is defined and/or redefined (modified) for high-quality rendition on a low-resolution pixel matrix screen.

Referring back to FIG. 5, at block 55, each of the redefined characters is rendered using a pixel-coverage technique and a set of rendering criteria. Specifically, after the adjustment of key points and width values in block 54, a pixel coverage value is calculated again for each pixel based on the redefined font data. Then, the pixels may be activated according to the following criteria: (i) a pixel may be activated if its coverage value is greater than a predefined value (e.g., 50%); and (ii) a pixel may be activated if outline segments of a stroke face each other within the pixel. Outline segments of a stroke may not necessarily be parallel to each other, but if they generally face each other the condition (ii) can be satisfied. For example, in FIG. 3B, outline segments 302 and 303 may be considered to face each other. Each stroke segment may be defined as a segment between two adjacent feature points. For example, in FIG. 3B, the stroke 31 includes three stroke segments 301, 302, and 303. The determination as to whether two outline segments face each other may be made automatically using a suitable image analysis technique, or manually or semi-automatically by a font designer.

Figure 1A:
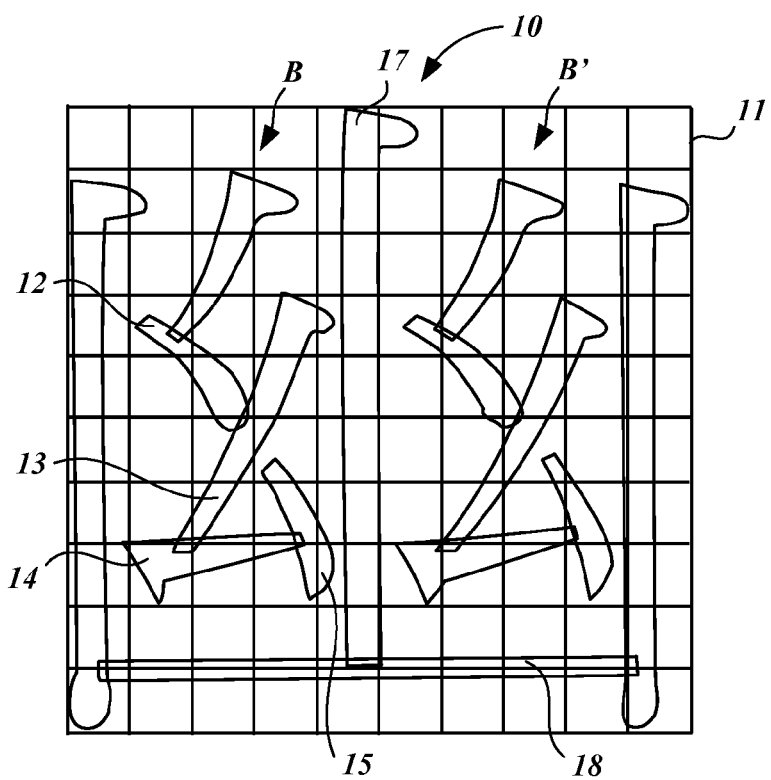
FIGS. 1A-1C illustrate characters and their images rendered on a relatively low-resolution display according to conventional methods.
Figure 1B:
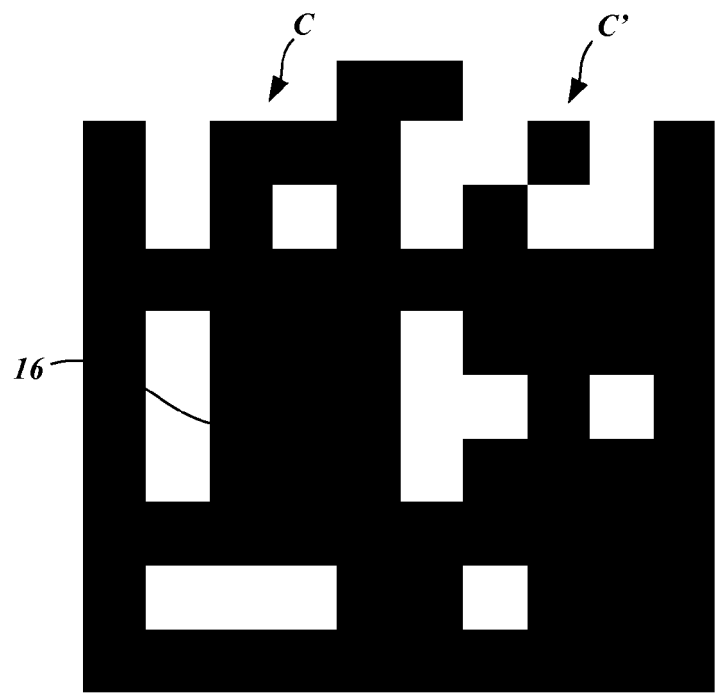
Figure 12A:
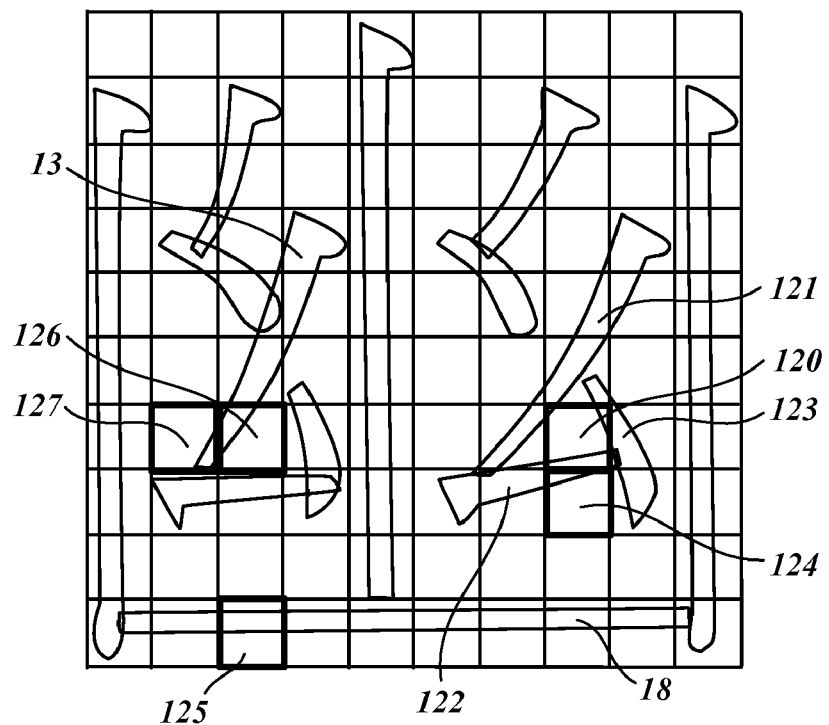
FIGS. 12A and 12B illustrate the same character as in FIGS. 1A and 1B, which has been modified and rendered on a low-resolution display in accordance with one embodiment of the present invention.
Figure 12B:
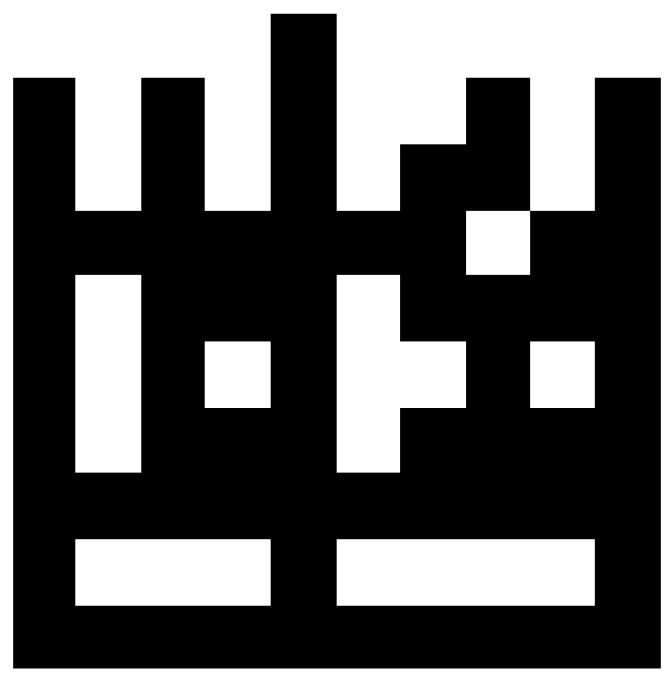

FIGS. 12A and 12B illustrate the same character 10, as shown in FIGS. 1A and 1B, but processed and rendered according to a method of the present invention as described above. Specifically, the key points and width values of various strokes forming the character 10 of FIG. 1A have been adjusted, as shown in FIG. 12A. Then, the redefined font data (with adjusted key points and width values) are rendered, according to the predefined rendering criteria, as shown in FIG. 12B. For example, in FIG. 12B, all pixels with a coverage value above 50% are activated, and all pixels including two outline segments facing each other are also activated. As a specific example, in FIG. 12A, a pixel 125 has two outline segments of the stroke 18 facing each other. Thus, even though the coverage value of the pixel 125 may be less than a predefined value (e.g., 50%), the pixel 125 is still activated, as shown in FIG. 12B.

Still referring to FIG. 5, finally, the font designer may visually confirm that each character is rendered properly by verifying, for example, that no strokes are merged together. If the font designer is satisfied, the font data is saved and the method of generating (or redefining) font characters for a low-resolution screen ends. On the other hand, if the font designer is not satisfied, then, returning to block 54 of FIG. 5, the unsatisfactory character is redefined, wherein the font designer may manually adjust the key points and/or width values of the strokes forming the unsatisfactory character. This process is repeated until the font designer is satisfied with the rendered appearance of the entire set of characters.

Figure 13A:
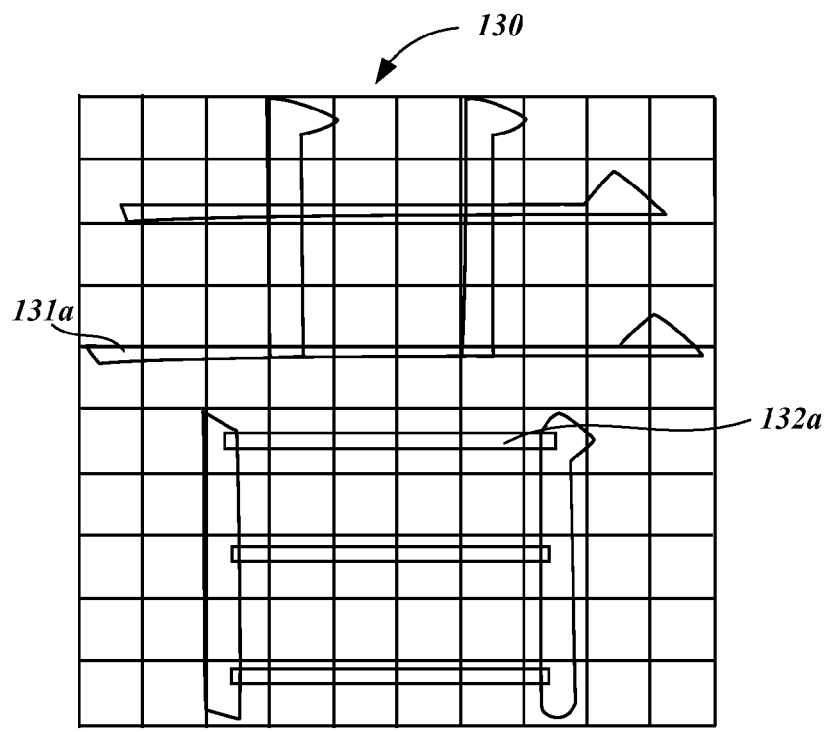
FIGS. 13A and 13B illustrate another character rendered on a low-resolution display according to a conventional method, with merged parallel strokes.
Figure 13B:
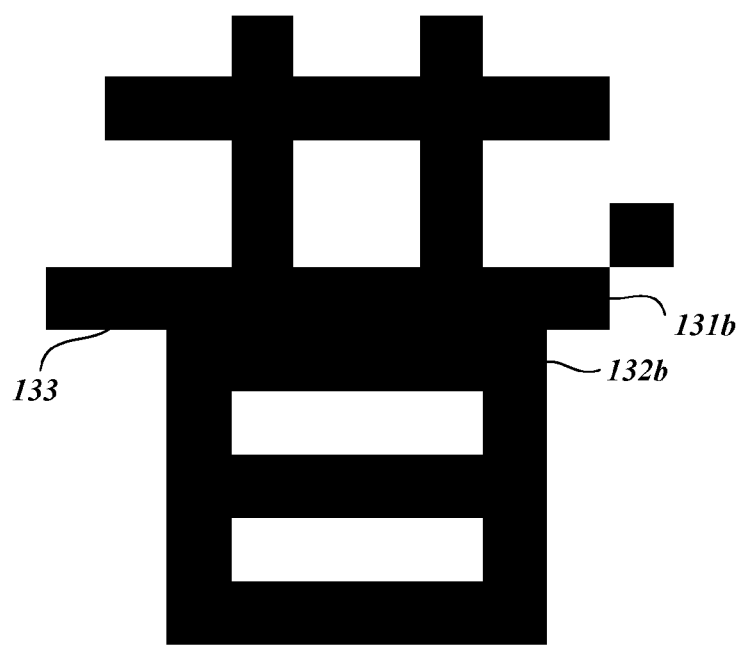

In accordance with a further aspect of the invention, a method is provided to ensure spacing between strokes that may otherwise be merged together when rendered on a low-resolution screen. Low-resolution rendering often causes strokes, in particular parallel strokes, in a character to overlap or merge, rendering the resulting character image unrecognizable. For example, two strokes 131a and 132a in FIG. 13A are rendered as 131b and 132b in FIG. 13B, which are merged together to appear as a single stroke 133. According to one embodiment of a method of the present invention, one or more pixels are specifically non-activated to provide the necessary spacing between strokes. This method of providing spacing between strokes may be used independently of, or jointly with, the method of defining/redefining font data by adjusting the positions of key points and/or width values, as described above.

Figure 14:
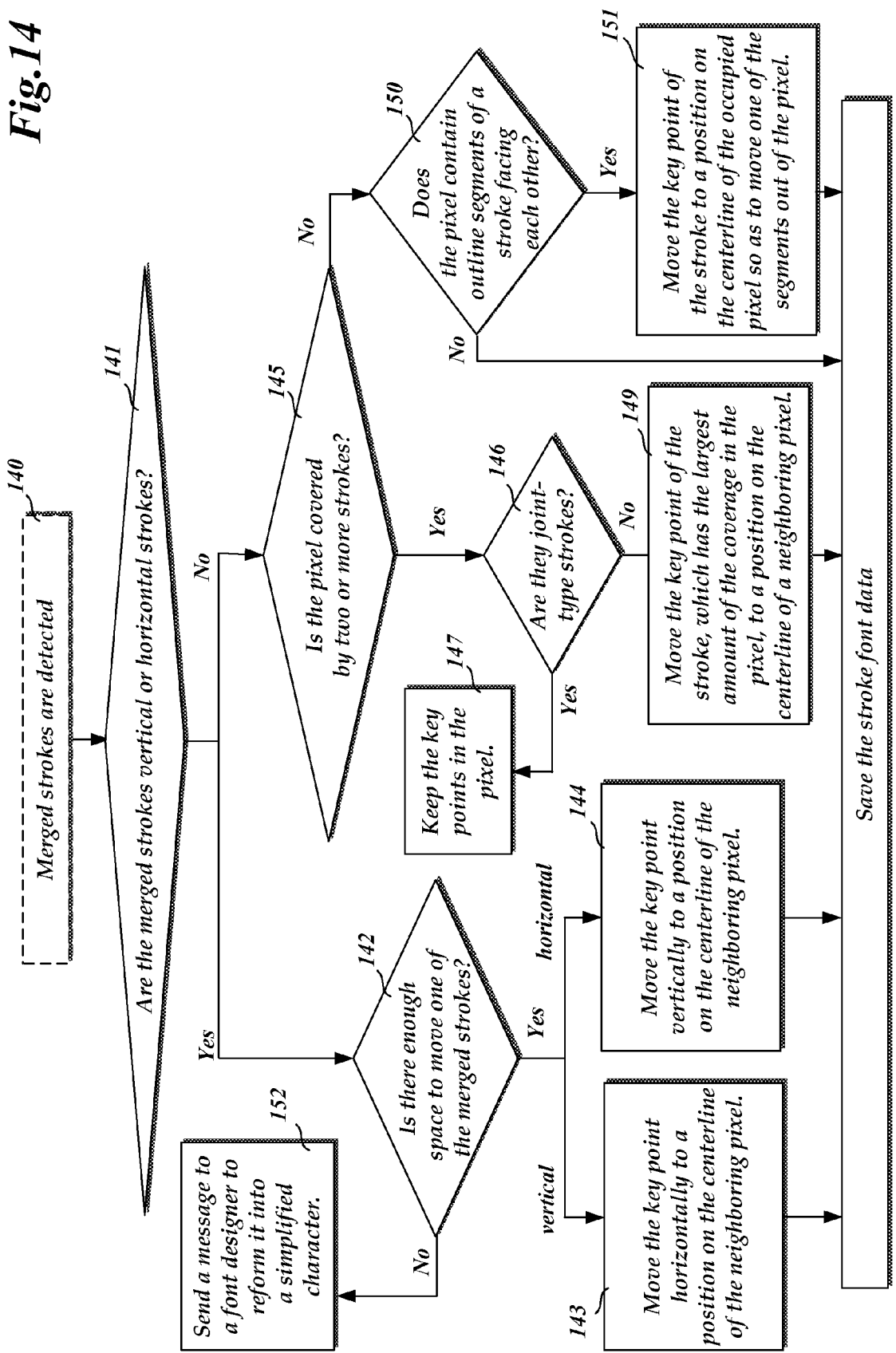
FIG. 14 is a flowchart depicting a method of providing space between merged strokes of a character, in accordance with one embodiment of the present invention.
Figure 15A:
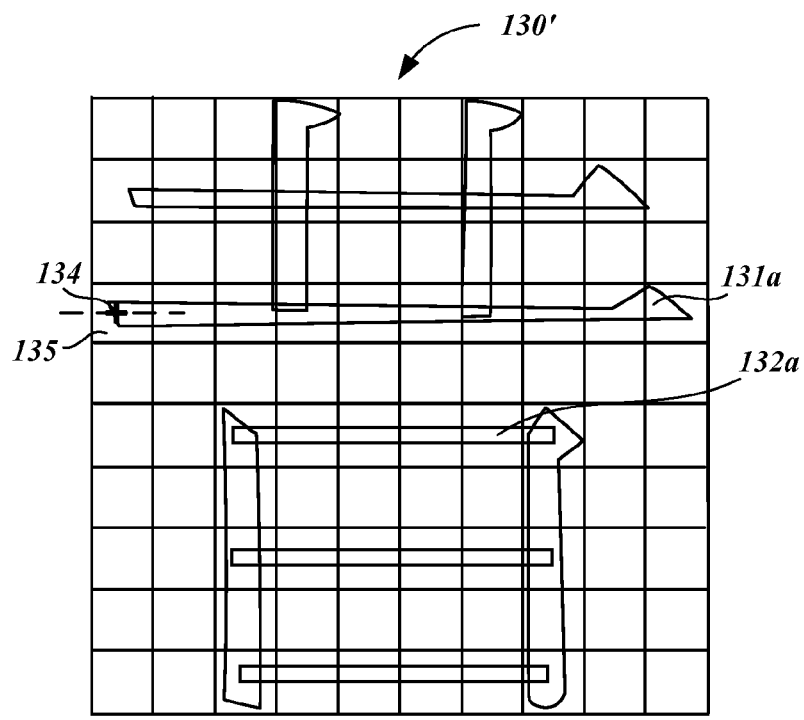
FIGS. 15A and 15B illustrate the same character as in FIGS. 13A and 13B, which has been modified and rendered on a low-resolution display with less merging, in accordance with the method of FIG. 14.
Figure 15B:
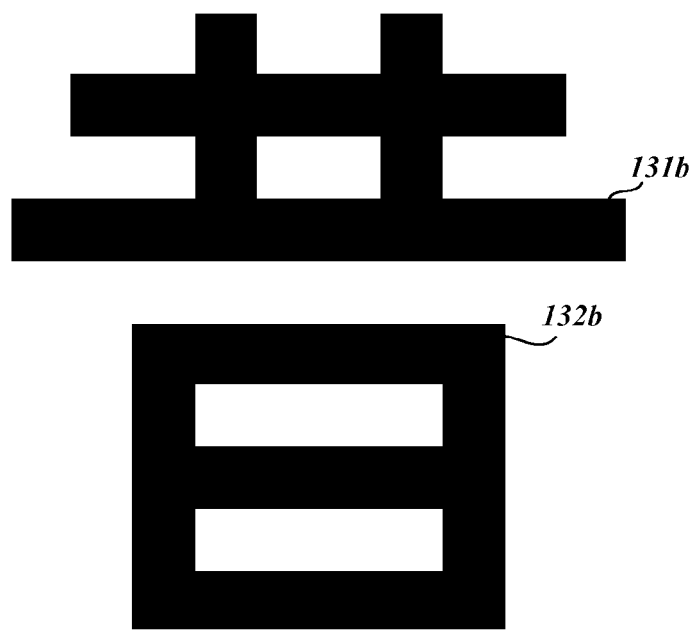

FIG. 14 is a flowchart depicting one example of a method for providing proper spacing in characters to be displayed on a low-resolution screen. Initially at block 140, any merged strokes may be detected. This may be done manually based on the visual inspection by a font designer, or automatically or semi-automatically based on a suitable image analysis technique. In block 141, the merged strokes are analyzed to determine whether they are horizontal strokes, vertical strokes, or neither (e.g., diagonal strokes that cannot be classified as either horizontal or vertical strokes). If the strokes are horizontal or vertical, then in block 142, it is determined whether there is enough space to move the strokes apart from each other without causing merging at different portion(s) of the character. Merged parallel strokes need at least one pixel array therebetween to serve as proper spacing. If the merged stokes are vertical strokes, in block 143, the key point(s) are moved horizontally to a position on the vertical centerline of a neighboring pixel to provide spacing. If the strokes are horizontal, in block 144 the key point(s) are moved vertically to a position on the horizontal centerline of a neighboring pixel. FIG. 15A illustrates the modified character 130' corresponding to the original character 130 of FIG. 13A. In the illustrated example of FIG. 15A, a key point 134 of the stroke 131a is moved vertically to a position on the horizontal centerline of a pixel 135, to thereby move the stroke 131a upward to be spaced apart from the stroke 132a. FIG. 15B illustrates the character 130' as displayed on a low-resolution screen, with proper spacing between the parallel strokes 131b and 132b.

Figure 16A:
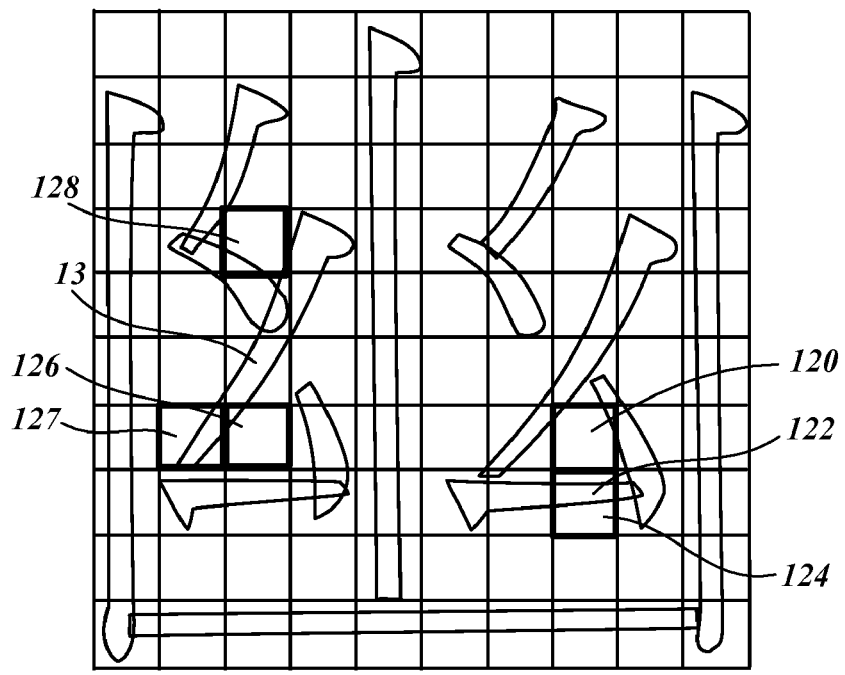
FIGS. 16A and 16B illustrate the same character as in FIGS. 12A and 12B, which is further modified and rendered with less merging in accordance with the method of FIG. 14.
Figure 16B:
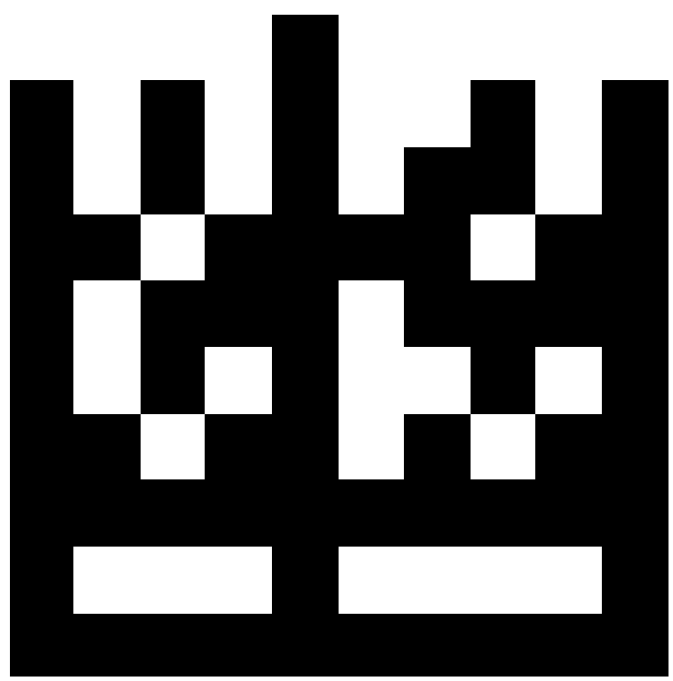

When merged strokes are neither horizontal or vertical, at block 145, each pixel in the merged strokes is analyzed to determine whether it is occupied by two or more strokes. If yes, then at block 146 it is determined whether the two or more strokes are joint-type strokes, i.e., those strokes that respectively have key points all occupying the same pixel. (See, FIGS. 4A and 4B.) If the strokes are joint-type strokes, in block 147 no action is taken and the key points of the joint-type strokes remain in the same pixel. On the other hand, if the strokes are not joint-type strokes, then in block 149, the key point of a stroke that covers the largest area of the pixel is moved to a position on the centerline of a neighboring pixel. For example, in FIG. 12A, a pixel 120 is covered by three strokes, 121, 122, and 123. Since these strokes are not joint-type strokes, the key point of the stroke 122, which covers the largest area within the pixel 120, is moved to a position along the centerline of a neighboring pixel 124, as shown in FIG. 16A. As shown in FIG. 16A, the pixel 120 will not be activated because its coverage value does not exceed a predefined threshold (e.g., 50%) and because it does not include two outline segments of a stroke facing each other. Thus, the pixel 120 provides proper spacing to render the character more recognizable, as shown in FIG. 16B.

If, at block 145 of FIG. 14, it is determined that the pixel is not covered by two or more strokes, then at block 150 it is determined whether the pixel contains outline segments of a stroke, which face each other. If yes, then in block 151, the key point of that stroke is moved to a position on the centerline of the pixel that the key point occupies, so as to move one of the outline segments outside of that pixel.

For example, in FIG. 12A, a pixel 126 contains two outline segments of the stroke 13 facing each other. In such case, the key point of the stroke 13, located within a pixel 127, is moved to a position on the centerline of that pixel 127, thereby moving one of the outline segments (the left-hand outline segment) of the stroke 13 out of the pixel 126. Consequently, as shown in FIG. 16A, the pixel 126 no longer includes two outline segments of a stroke facing each other, and as such will not be activated (assuming that its coverage area does not exceed a predefined threshold, such as 50%). As shown in FIG. 16A, this results in the pixel 126 (and similarly a pixel 128) providing proper spacing for the character, to render the overall character as displayed on a low-resolution screen more recognizable (FIG. 16B) as compared with both the prior art (FIG. 1B) and a previous embodiment without a specific method of providing proper spacing (FIG. 12B). In FIG. 16B, because of spacing provided by pixels 120, 126, and 128, the character image is fairly representative of the original Chinese character.

Figure 1C:
Figure 1C:
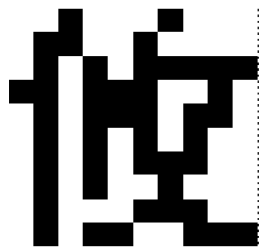
Figure 1C:
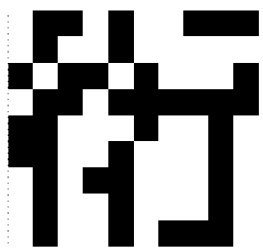
Figure 1C:
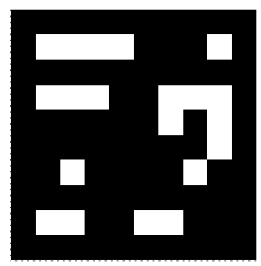
Figure 1C:
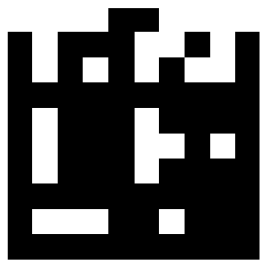
Figure 17:
FIG. 17 illustrates the same five Chinese characters as in FIG. 1C, which are modified and rendered on a low-resolution display in accordance with a method of the present invention.
Figure 17:
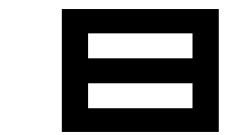
Figure 17:
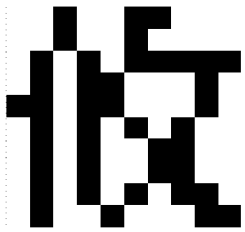
Figure 17:
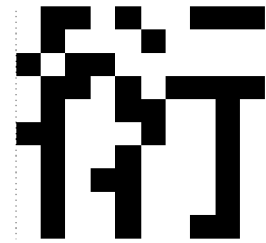
Figure 17:
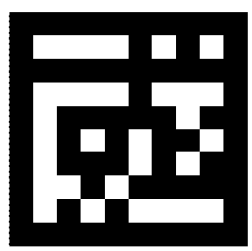
Figure 17:
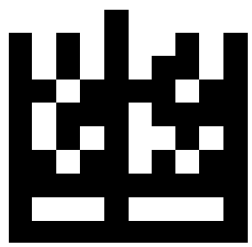

FIG. 17 illustrates the same five Chinese characters as in FIG. 1C, which are modified and rendered on a low-resolution display using the methods of the present invention. Specifically, the font data are modified with adjusted key points and width values (See, FIG. 5) and further provided with proper spacing (FIG. 14), then rendered according to detected pixel-coverage and predefined rendering criteria.

Figure 18A:
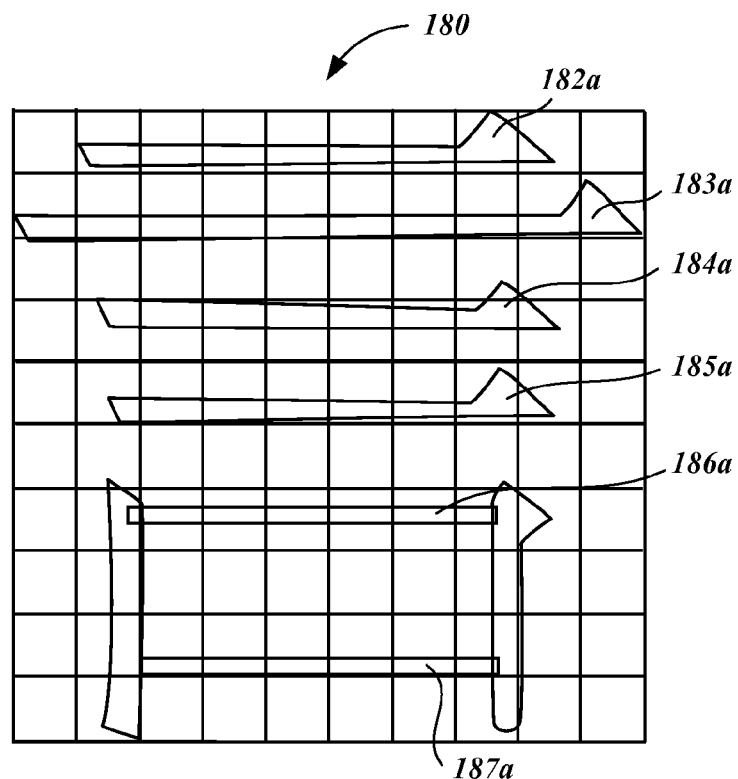
FIGS. 18A and 18B illustrate yet another character rendered on a low-resolution display according to a convention method, with merged parallel strokes.
Figure 18B:
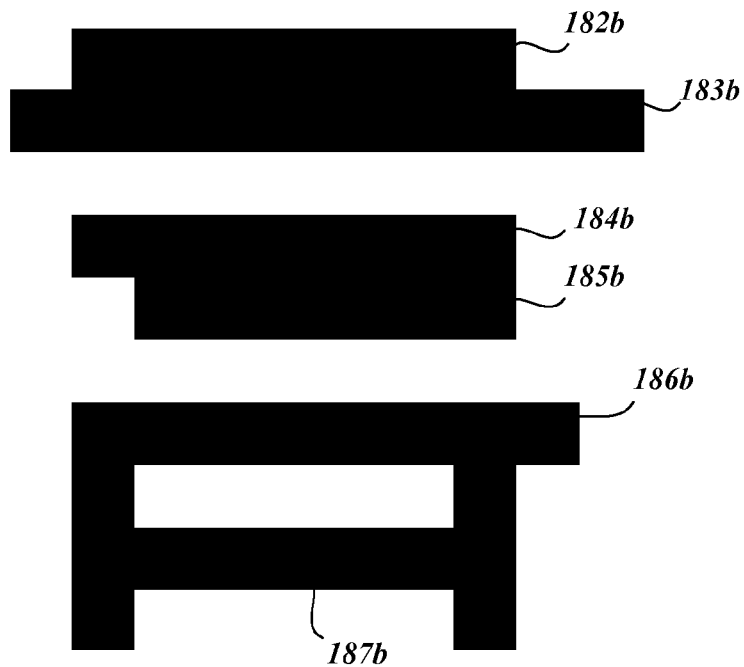

As a low-resolution screen has a limited number of pixels, in some cases there simply is no space for moving one or more merged strokes. In such cases, referring to block 152 of FIG. 14, a font designer may be prompted to redefine the character into a simplified form. FIG. 18A illustrates a character 180, which includes as many as six horizontal strokes 182a-187a. FIG. 18B illustrates the character 180 as rendered on a low-resolution screen, wherein the six horizontal strokes have merged into four horizontal strokes, with horizontal strokes 182b and 183b, and 184b and 185b, respectively, jammed together. However, none of the key points of the jammed strokes can be moved because there is no room available within the limited character size (10×10 pixels in this example). For example, moving key points of the jammed stroke 185b downward will cause another set of strokes (185b and 186b in the illustrated example) to merge together.

Figure 19A:
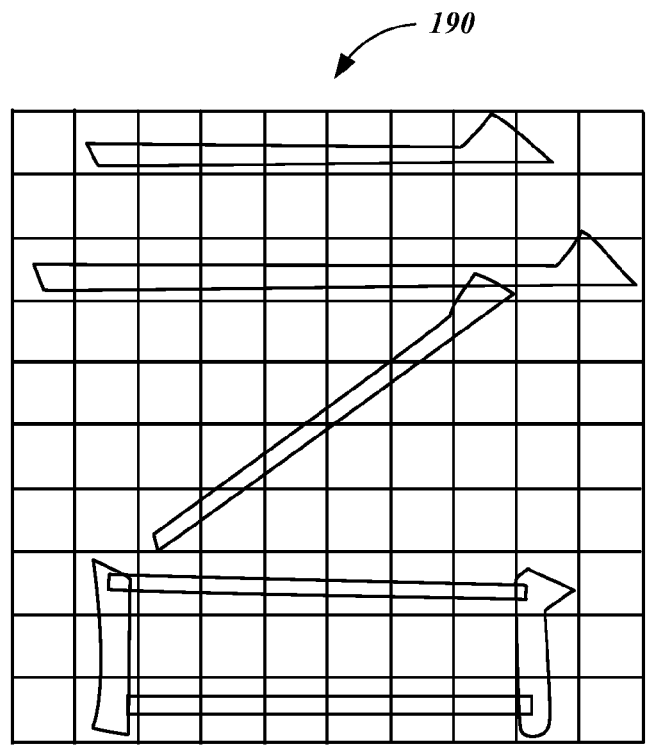
FIGS. 19A and 19B illustrate the same character as in FIGS. 18A and 18B, which has been simplified and rendered on a low-resolution display in accordance with one embodiment of the present invention.
Figure 19B:
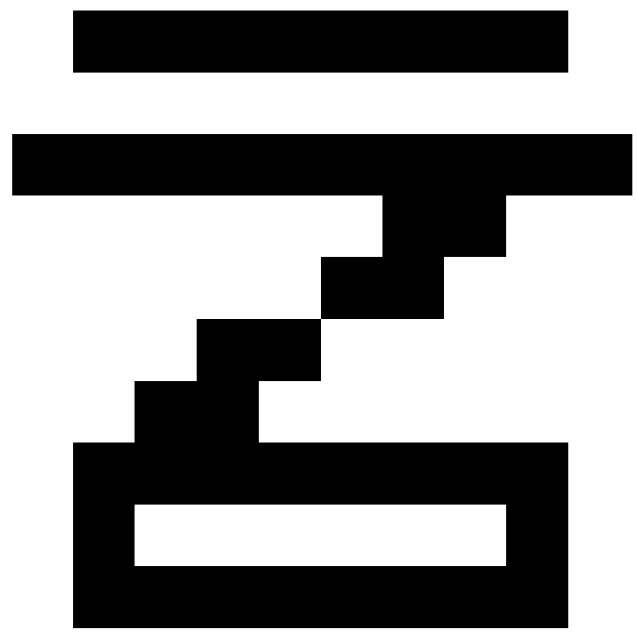

In such cases, the font designer may replace such a character with a simplified version of the same character. FIGS. 19A and 19B illustrate a simplified character 190 corresponding to the character 180 of FIG. 18A. The font designer may define and store such simplified characters.

Various methods of the present invention may be practiced using a graphical user interface (GUI) or CAD tool. For example, a GUI tool for use in a Windows®-based operating system may be used, though a GUI tool can be implemented in various other types of operating systems. It is also noted that one or more steps of any method performed by a GUI tool can be performed automatically using image analysis techniques.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of generating a set of characters to be displayed on a low-resolution screen, wherein the set of characters is predefined in higher resolution, each of the characters comprises one or more strokes/glyphs based on a basic stroke/glyph, and each basic stroke/glyph is defined in terms of key points and width values, the method comprising:
   (a) receiving the set of characters predefined in higher resolution;
   (b) projecting the received set of characters on a pixel matrix screen having two-dimensional coordinates and corresponding to the low-resolution screen;
   (c) redefining a stroke/glyph forming the received set of characters by adjusting the key point and width value of the stroke/glyph, to thereby form a redefined set of characters; and
   (d) rendering the redefined set of characters according to predefined rendering criteria,
   wherein step (c) further includes:
   (i) identifying two or more strokes/glyphs that are merged together and that are neither vertical strokes or horizontal strokes; and
   (ii) providing spacing between the strokes/glyphs identified in step (i) above by performing steps including:
   (a) for any pixel occupied by the strokes/glyphs identified in step (i) above, determining whether the pixel contains two or more key points respectively belonging to two or more strokes/glyphs, and if so, determining the two or more strokes/glyphs respectively having their key points occupying the same pixel to be joint-type strokes/glyphs; and determining each of the strokes/glyphs identified in step (i) and not determined to be the joint-type strokes/glyphs to be an independent-type stroke/glyph, (b) for each pixel occupied by two or more independent strokes/glyphs, determining a coverage value of each of the two or more independent strokes/glyphs within the pixel, and moving the key point of independent stroke/glyph, which has a largest coverage value, to a centerline of a neighboring pixel adjacent to the pixel, and (c) maintaining the key points of the joint-type strokes/glyphs in their original positions.

2. The method of claim 1, wherein each of the strokes/glyphs forming the set of characters is defined in terms of key points, width values, feature points that have predefined spatial relationship to the key points and width values, and curve ratios that define curves between the feature points.

3. The method of claim 1, wherein step (c) comprises moving the key point of the stroke/glyph to a centerline of a pixel.

4. The method of claim 3, wherein step (c) comprises moving the key point of a vertical stroke/glyph to a vertical centerline of a pixel that the key point occupies, and moving the key point of a horizontal stroke/glyph to a horizontal centerline of a pixel that the key point occupies.

5. The method of claim 3, wherein when a curved portion of the stroke/glyph occupies more than one pixel and each of the more than one pixels has a coverage value, step (c) comprises moving the key point of the stroke/glyph that controls the curved portion to a position on a centerline of one of the more than one pixels having the largest coverage value.

6. The method of claim 1, wherein step (c) further comprises: (iii) identifying two or more strokes/glyphs that are merged together and are vertical strokes or horizontal strokes and (iv) moving the key point of one of the strokes/glyphs identified in step (iii) above to a centerline of a neighboring pixel adjacent to a pixel that the key point originally occupied.

7. The method of claim 1, wherein a pixel includes outline segments of a stroke/glyph that face each other, and step (c) further comprises moving the key point of the stroke/glyph to a centerline of a pixel that the key point originally occupied, so as to move one of the outline segments included in the pixel out of that pixel.

8. The method of claim 1, wherein step (d) comprises activating a pixel of the low-resolution screen if:
(i) the pixel contains outline segments of a stroke/glyph that face each other; or
(ii) the pixel has a coverage value greater than a predefined threshold value.

9. A non-transitory computer-readable medium including computer-executable instructions which, when loaded onto a computer, cause the computer to perform the method of claim 8.

10. A non-transitory computer-readable medium including computer-executable instructions which, when loaded onto a computer, cause the computer to perform the method of claim 1.

11. The method of claim 1, wherein step (c) comprises reducing the width value of the stroke/glyph to fit within a pixel size.

12. A computer graphical user interface tool for generating a set of characters to be displayed on a low-resolution screen, wherein the set of characters is predefined in higher resolution, each of the characters comprises one or more strokes/glyphs based on a basic stroke/glyph, and each basic stroke/glyph is defined in terms of key points and width values, the tool comprising:

a module configured to receive the predefined set of characters;

a module configured to project the predefined set of characters on a pixel matrix screen having two-dimensional coordinates and corresponding to the low-resolution screen;

a module configured to redefine a stroke/glyph forming the set of characters by adjusting the key point and width value of the stroke/glyph, to thereby form a redefined set of characters; and a module configured to render the redefined set of characters according to predefined rendering criteria, wherein the module configured to redefine a stroke/glyph forming the set of characters is further configured to:

(i) identify two or more strokes/glyphs that are merged together and that are neither vertical strokes or horizontal strokes; and (ii) provide spacing between the strokes/glyphs identified in (i) above by performing steps including:

(a) for any pixel occupied by the strokes/glyphs identified in (i) above, determining whether the pixel contains two or more key points respectively belonging to two or more stroke/glyphs, and if so, determining the two or more strokes/glyphs respectively having their key points occupying the same pixel to be joint-type strokes/glyphs; and determining each of the strokes/glyphs identified in (i) and not determined to be the joint-type strokes/glyphs to be an independent-type stroke/glyph, (b) for each pixel occupied by two or more independent strokes/glyphs, determining a coverage value of each of the two or more independent strokes/glyphs within the pixel, and moving the key point of an independent stroke/glyph, which has a largest coverage value, to a centerline of a neighboring pixel adjacent to the pixel, and (c) maintaining the key points of the joint-type strokes/glyphs in their original positions.

13. The tool of claim 12, wherein the module configured to redefine a stroke/glyph forming the set of characters, upon identifying two or more strokes/glyphs that are merged together, prompts a font designer to define a simplified version of the character.

14. The tool of claim 12, wherein the module configured to render the redefined set of characters activates a pixel of the low-resolution screen if:
(i) the pixel contains outline segments of a stroke/glyph that face each other; or
(ii) the pixel has a coverage value greater than a predefined threshold value.

15. The tool of claim 12, wherein the module configured to redefine a stroke/glyph forming the set of characters is further configured to move the key point of the stroke/glyph to a centerline of a pixel.

16. The tool of claim 12, wherein the module configured to redefine a stroke/glyph forming the set of characters is further configured to reduce the width value of the stroke/glyph to fit within a pixel size.

\* \* \* \* \*

UNITED STATES PATENT AND TRADEMARK OFFICE
CERTIFICATE OF CORRECTION

PATENT NO. : 8,243,077 B2  
APPLICATION NO. : 12/202158  
DATED : August 14, 2012  
INVENTOR(S) : Kuo-Young Cheng Page 1 of 1

It is certified that error appears in the above-identified patent and that said Letters Patent is hereby corrected as shown below:

Column 11, Line 39:
"merged together and are vertical strokes or horizontal strokes" should read, --merged together and are vertical strokes or horizontal strokes;--.

Signed and Sealed this
Twenty-fifth Day of September, 2012

David J. Kappos
*Director of the United States Patent and Trademark Office*